United States Patent [19]

Iati

[11] Patent Number: 4,804,223

[45] Date of Patent: Feb. 14, 1989

[54] MOTOR VEHICLE WITH FINGER GUARD

[76] Inventor: James S. Iati, 1361 Norton St., Rochester, N.Y. 14621

[21] Appl. No.: 52,407

[22] Filed: May 21, 1987

[51] Int. Cl.$^4$ ................................................ B60J 5/00
[52] U.S. Cl. ........................................ 296/152; 49/462
[58] Field of Search ............... 296/146, 152; 49/383, 49/462, 483, 496

[56] References Cited

U.S. PATENT DOCUMENTS

| | | | |
|---|---|---|---|
| 1,444,994 | 2/1923 | White | 49/383 |
| 1,894,102 | 1/1933 | Kuenzel | 49/383 |
| 1,929,494 | 10/1933 | Horlick, Jr. | 49/383 X |
| 2,242,421 | 5/1941 | Dodge | 49/383 X |
| 2,331,340 | 10/1943 | Mosher | 49/383 |
| 3,319,697 | 5/1967 | Krohn | 49/383 |
| 3,667,163 | 6/1972 | Bjorum et al. | 49/462 |
| 3,726,559 | 4/1973 | Wilfort et al. | 296/146 X |
| 4,029,353 | 6/1977 | Barenyi et al. | 296/146 X |
| 4,085,966 | 4/1978 | Ringe | 296/146 |
| 4,222,603 | 9/1980 | Breitschwerdt et al. | 296/146 |
| 4,436,336 | 3/1984 | Shimizu | 49/383 X |
| 4,570,383 | 2/1986 | Adell | 49/462 |

FOREIGN PATENT DOCUMENTS

| | | | |
|---|---|---|---|
| 1309286 | 10/1962 | France | 49/383 |
| 8001090 | 5/1980 | World Int. Prop. O. | 49/383 |

Primary Examiner—Dennis H. Pedder
Attorney, Agent, or Firm—John H. Faro

[57] ABSTRACT

The combination of a motor vehicle having a door that is hinged to open outwardly from a closely-fitting door opening and a finger guard comprising a first flexible strip attached to the distal edge of the door and overlapped over the adjacent edge of the door opening. A second flexible strip may be attached to the overlapped edge of the door opening under the first strip. The invention includes the finger guard itself which is adapted to be combined with a motor vehicle as described above.

5 Claims, 1 Drawing Sheet

MOTOR VEHICLE WITH FINGER GUARD

BACKGROUND OF THE INVENTION

1. Field of the Invention

This invention relates to a novel combination of a motor vehicle and a finger guard on a door of the vehicle. The finger guard will prevent fingers from being caught between the door and the door opening when the door is closed.

2. Description of the Prior Art

Motor vehicles, and particularly passenger cars, comprise a passenger cabin having at least one access door. The door is usually hinged along the forward or front edge thereof to swing outwardly from a closely-fitting door opening. The door opening is an integral part of the body of the vehicle.

It often happens that children, and sometimes adults, have their fingers caught between the vehicle door and the door opening when the door is closed. Children frequently wrap their fingers over the distal edge of the open door, and then close the door without withdrawing their fingers. Or, because of the door's weight and mounting, a child will grap the open door with one hand, place the other hand in the door opening, and then close the door on the hand in the opening. Adults, particularly older people, may have similar accidents.

Finger guards for motor vehicle doors to prevent injuries to fingers have been suggested previously. U.S. Pat. Nos. 1,444,398 to S. J. Shepherd, 1,444,994 to J. F. White, and 1,894,102 to S. H. H. Kuenzel, each disclose a guard that is placed over the hinged or proximal edge of the door to prevent injury to occupants in the vehicle. These guards are not effective to prevent injury at the distal edge of the door to persons outside the vehicle. The finger guard disclosed in U.S. Pat. No. 2,955,871 to J. Himka is too complicated and expensive for current vehicle designs.

Finger guards which cover the hinged juncture between two panels, such as those disclosed in U.S. Pat. Nos. 1,626,844 to C. J. Kuhn, 2,694,234 to S. S. Roby et al, and 3,319,697 to J. M. Krohn, are also ineffective to prevent injury at the distal edge of a vehicle door. Guards that are used over a hinged juncture, if used at the distal edge of a hinged vehicle door, would interfere with the use of the door for access to the interior of the vehicle.

U.S. Pat. No. 4,261,140 to J. C. McLean discloses a finger guard for use on a door of a nursery school. In that arrangement, a portion of the door along its distal edge is removed and replaced with a soft rubber or plastic material. Fingers which are caught between the soft distal edge of the door and the hard rigid door jam can be removed easily without injury. Such a structure is not desirable for the doors of motor vehicles for reasons of cost, comfort in very cold or very hot weather, short service life, and reduced safety if the vehicle is involved in a crash.

OBJECTS OF THE INVENTION

An object of this invention is to provide a novel finger guard for use with a motor vehicle.

Another object of this invention is to provide a novel combination of a motor vehicle and the novel finger guard.

A further object of this invention is to provide a finger guard in combination with a motor vehicle which will prevent injury to a person's fingers when a door of the vehicle is closed.

Another object of this invention is to provide a combination of a finger guard and a motor vehicle which is particularly adapted to prevent injuries to fingers at the distal edge of a hinged, outwardly-opening door of the vehicle.

SUMMARY OF THE INVENTION

The novel combination comprises a motor vehicle having a door that is hinged to open outwardly from a closely-fitting door opening. A finger guard comprising a first flexible strip is attached to the distal edge of the door, preferably along the outer surface thereof, and overlaps the adjacent edge of the door opening. A second flexible strip may be attached to the overlapped edge of the door opening under the first strip.

When fingers are curled around the distal edge of the door, they extend over the first strip and not over the rigid portions of the door. When the door is closed, the fingers are under the flexible strip, remain uninjured, and are removed easily without injury. The second strip acts as a stop and as a signal to anyone sliding their fingers along the outside surface of the vehicle into the door opening. When those fingers meet the second strip, it blocks further movement and signals that those fingers should go no further.

The invention includes the finger guard itself which is adapted for combination with a motor vehicle as described above. The novel finger guard includes both the first flexible strip and the second flexible strip, both strips being adapted for attachment to a motor vehicle as described above. In a preferred embodiment of the invention, both strips are curved in their transverse direction to impart a degree of rigidity and to permit their nesting together when the door is closed.

DETAILED DESCRIPTION OF THE INVENTION INCLUDING THE PREFERRED EMBODIMENT

Figure 1:
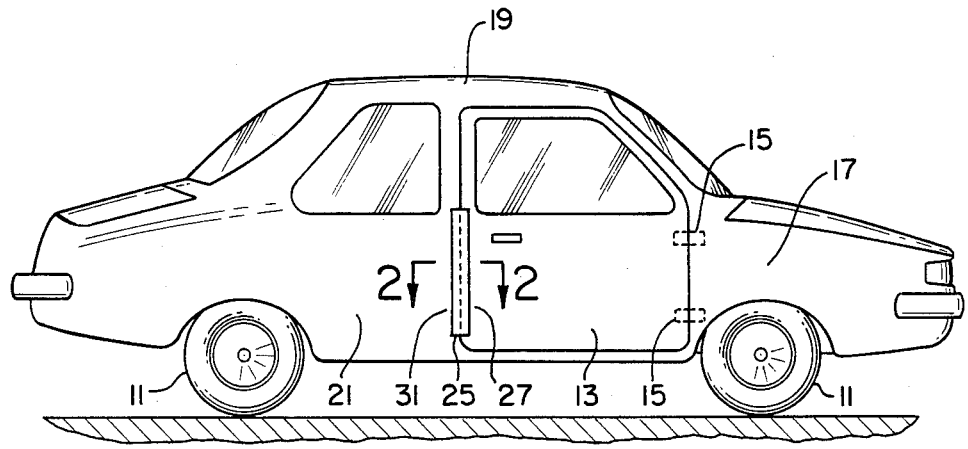
FIG. 1 is a side elevational view of a preferred embodiment of the novel combination of a motor vehicle and a finger guard.

The following description of some of the embodiments of concepts of this invention is made in reference to the accompanying figures. Where an individual element of these figures is depicted in more than one figure, it is assigned a common reference numeral for simplification and understanding.

FIG. 1 shows a passenger motor vehicle of conventional design including a chassis with four motor-driven wheels (11) and a body having two access doors (13), one on each side. Each door (13) is mounted in a door opening on hinges (15) at the front or forward vertical edge of the door (13) and the door opening. The door opening does not have a frame but is defined by the surrounding body; specifically, a fender (17) at its forward vertical edge, a roof (19) at its upper edge, and a quarter panel (21) at its rearward vertical edge.

The door (13) is hinged to swing outwardly when it is opened and fits closely in the door opening, although not against the metal parts of the door opening. A spongey rubber or plastic gasket (23) is located between the door (13) and the door opening, as shown in FIG. 2.

Figure 2:
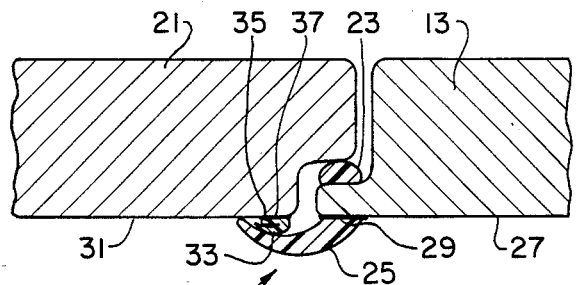
FIG. 2 is a sectional view of a fragment of the novel combination shown in FIG. 1 viewed along section line 2—2 with the door closed.

As shown in FIGS. 1 and 2, a door element (24) in the form of a first flexible strip (25) is attached to the outer surface of the door (13) along its rearward vertical door edge (27), which is its distal edge, as with adhesive (29), along one longitudinal side of the strip (25). The first strip (25) extends rearwardly in its transverse dimension in cantilever fashion over the outer body surface (31) adjacent to the door opening.

A jamb element (32) comprising a second flexible strip 33 is connected along one longitudinal edge to the longitudinal edge of a mounting flange (35), which is attached to the outer body surface (31) adjacent to the abovementioned adjacent door opening, as with adhesive (37). The first strip (25) overlaps and compresses the second strip (33) against the flange (35) when the door is closed.

Figure 3:
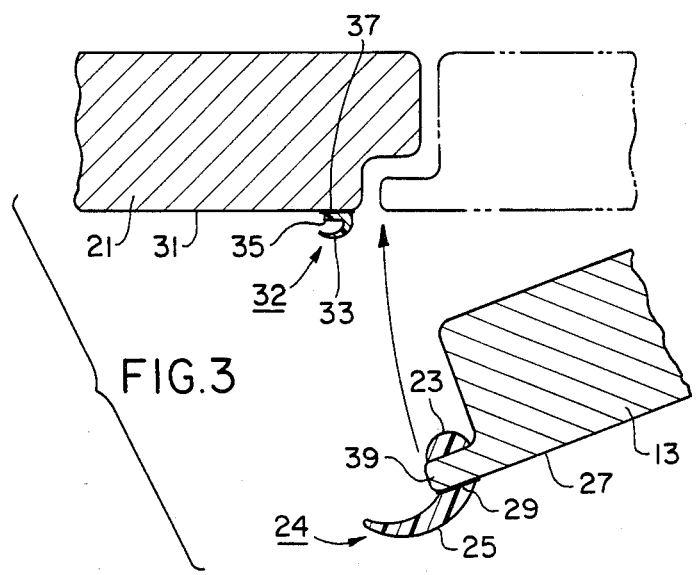
FIG. 3 is a sectional view of the fragment shown in FIG. 2. with the door partly open.

When the door (13) is opened, as shown in FIG. 3, the first strip (25) moves outwardly with the door (13). The second strip (33) springs up as shown and remains in a stationary position. Should any fingers slide over the outer surface of the quarter panel (21) into the door opening, those fingers would be blocked by the jamb element (32) and particularly by the upstanding second strip (33). Both the first strip (25) and the second strip (33) are arcuate or crescent-shaped in their transverse directions, curving inwardly towards the outer surface of the vehicle. This provides a desired degree of rigidity to the strips and also permits the strips to nest together when the door (13) is closed.

Should fingers grasp and curl around the distal edge (27) of the door (13), they would curl around the first strip (25) and not around the rigid metal rim (39) (FIG. 3). If they remain there when the door (13) is closed, they are unlikely to be caught between the metal rim (39) and the door opening. Instead, they are most likely to be caught between the first strip (25) and the second strip (37) which are flexible and yielding so as to cause no injury to the fingers and to permit easy removal of the fingers without injury. If the jamb element (32) is not present, the fingers over the first strip would be protected as well.

The foregoing embodiment may be applied to any and all of the side doors of a motor vehicle, which doors are hinged. The finger guard may be used on liftback or latchback doors which are hinged at the top as well as on doors that are hinged at the side. The finger guard may be applied at the distal edge of the door and, in many cases, may be applied to the door edges between the distal edge and the proximal edge of the door.

The foregoing figures and the descriptions thereof are provided as illustrative of the preferred embodiment of the concepts of this invention. While this embodiment represents what is regarded as the best mode for practicing this invention, it is not intended as delineating the scope of the concepts, which are set forth in the following claims.

What is claimed is:

1. A finger guard in combination with a motor vehicle, said vehicle comprising a vehicle body having an outer body surface and a door opening therein defined by a body edge of the surrounding vehicle body, a door having an outer door surface, a proximal door edge and a distal door edge opposite said proximal door edge, said door being mounted in said door opening, said door being hinged along said proximal door edge to open outwardly and to fit closely in said door opening with a space between said body edge and said distal door edge, said finger gaurd including a door element in the form of a first flexible and yielding strip adhesively attached to said outer door surface along the distal edge of said door, said door element extending in cantilever fashion and overlapping the outer body surface adjacent to said door opening and the space therebetween, said door element having a transverse dimension substantially perpendicular to the longitudinal dimension of said distal edge of said door and longitudinal door-element edges substantially parallel to said longitudinal dimension of said distal edge of said door, said door element being substantially crescent-shaped in its transverse dimension curving outwardly from said outer surface of said door and then inwardly towards said outer body surface adjacent to said door opening.

2. The combination defined in claim 1, wherein said finger guard includes a jamb element comprising a second flexible and yielding strip adhesively attached to said outer body surface adjacent to said door opening and being overlapped by said first strip when said door is closed, said jamb element having a transverse jambelement dimension substantially perpendicular to the longitudinal dimension of said distal edge of said door, and longitudinal jamb-element edges substantially parallel to the longitudinal dimension of said distal edge of said door.

3. The combination defined in claim 2, wherein said door element is mounted from one longitudinal door-element edge thereof to the outer surface of said door, and said jamb element is mounted from one longitudinal jamb-element edge thereof to the outer body surface adjacent to said door opening.

4. The combination defined in claim 2, wherein said door has a forward vertical door edge and a rearward vertical door edge, said door is hinged along the forward vertical door edge thereof, and said door element is attached along the rearward vertical door edge.

5. The combination defined in claim 4, wherein said jamb element includes one of said mounting flange attached to and integral with a longitudinal jamb-element edges of said second strip.

* * * * *